United States Patent [19]

Houston et al.

[11] 4,099,242

[45] Jul. 4, 1978

[54] ONE-PASS GENERAL ASSOCIATIVE SEARCH PROCESSOR

[76] Inventors: George B. Houston, 742 Boylston Ave. E., Seattle, Wash. 98102; Roger H. Simonsen, 26840-8th Ave. S., Kent, Wash. 98031

[21] Appl. No.: 738,392

[22] Filed: Nov. 3, 1976

[51] Int. Cl.² .................... G06F 7/28; G06F 7/34; G11C 15/00
[52] U.S. Cl. ............................................ 364/200
[58] Field of Search ............. 340/173 AM, 173 RC; 364/200 MS File, 900 MS File

[56] References Cited

U.S. PATENT DOCUMENTS

| | | | |
|---|---|---|---|
| 3,293,615 | 12/1966 | Mullery et al. | 364/200 |
| 3,643,226 | 2/1972 | Loizides et al. | 364/900 |
| 3,648,254 | 3/1972 | Beausoleil | 364/200 |
| 3,848,235 | 11/1974 | Lewis et al. | 364/200 |
| 3,906,455 | 9/1975 | Houston et al. | 364/200 |
| 3,936,806 | 2/1976 | Batcher | 364/200 |
| 3,987,419 | 10/1976 | Morrill et al. | 364/200 |

*Primary Examiner*—Melvin B. Chapnick

[57] ABSTRACT

An apparatus for searching stored data in accordance wit a search specification established by a digital computer. The data is stored in data tracks which form the storing medium on a memory device. The data is in the form of logical records, each record comprising a number of data fields. The search specification designates one or more of the data fields as range fields and may designate one field as a value field. The search specification also includes range field values and range field operators for each designated range field, and a value field operator for the designated value field. The apparatus includes a first processor, which comprises a variable number of first subprocessors equal to the number of data tracks simultaneously applied to the input of the apparatus. Each first subprocessor is operative to apply the range field values and operators against the designated range fields, and may also apply them against the designated value field, of each successive record in a data track. This process is referred to as range testing and results in the identification of those logical records which satisfy all the range tests. The designated value field is recognized during range testing and its content is stored. A second processor applies the value operator against the designated value field previously recognized and stored during range testing, and determines which value field, and hence which record, best satisfies the value test among those presented simultaneously at its input. The results of the second processor are then used to update the indication of the one record best satisfying both the range and value tests of all the records previously presented to the apparatus.

16 Claims, 17 Drawing Figures

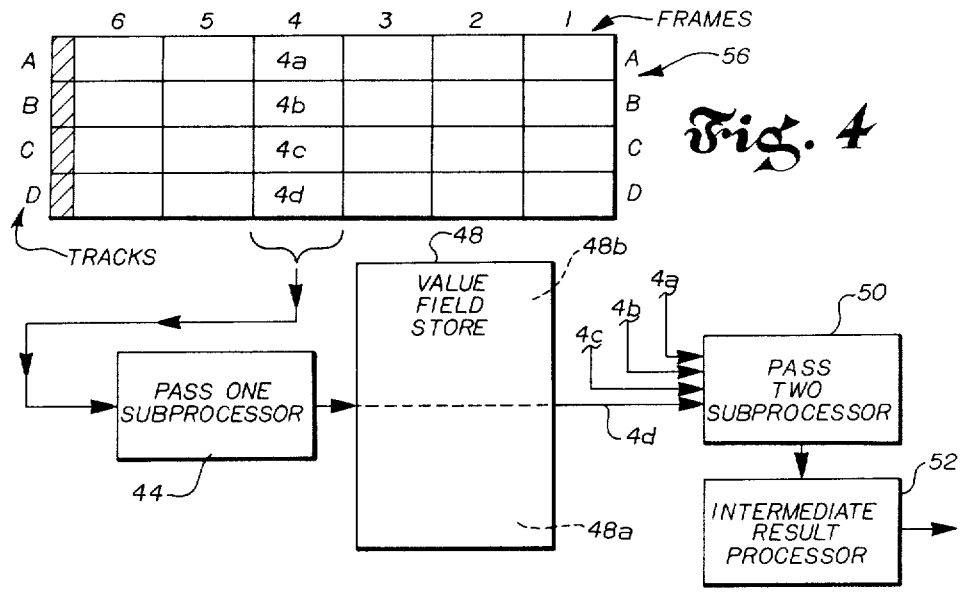
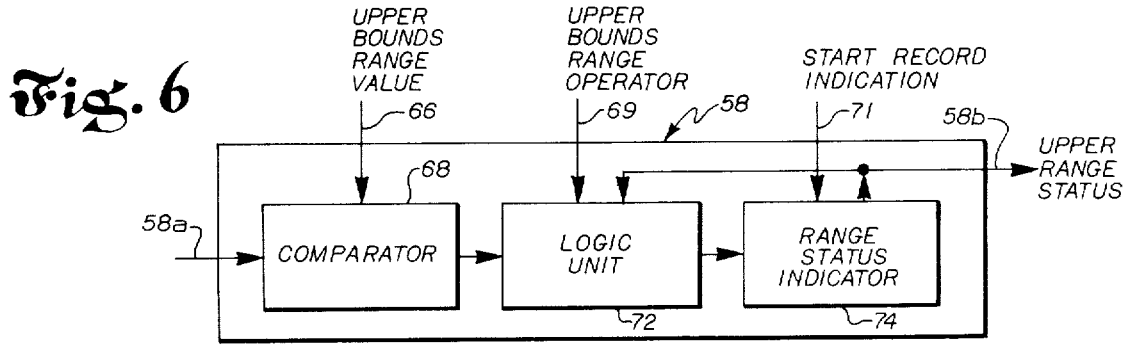

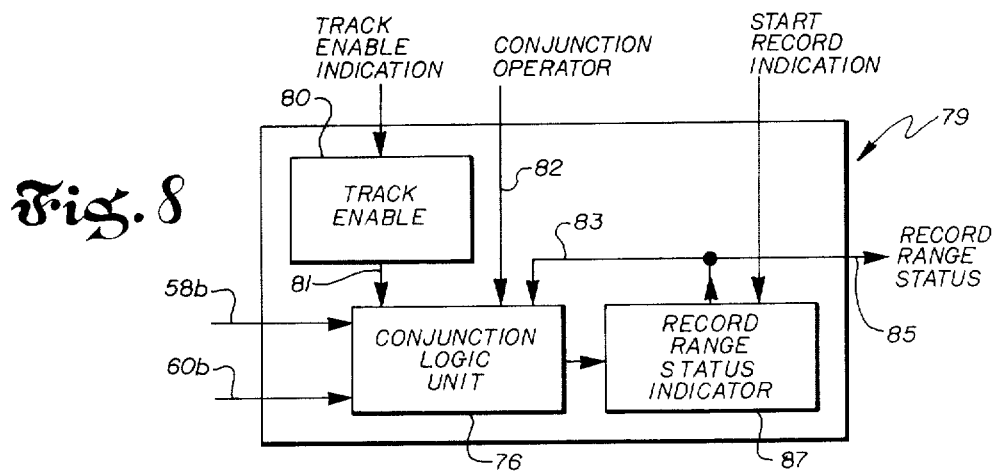

Fig. 8

| INPUTS TO CONJUNCTION LOGIC UNIT | | | | | RESULTING RECORD RANGE STATUS (LINE 85) |
|---|---|---|---|---|---|
| TRACK ENABLE (LINE 81) | RECORD RANGE STATUS (LINE 83) | CONJUNCTION OPERATOR (LINE 82) | UPPER BOUNDS RANGE STATUS (LINE 58b) | LOWER BOUNDS RANGE STATUS (LINE 60b) | |
| 0 | X | X | X | X | 0 |
| 1 | 0 | X | X | X | 0 |
| | 1 | 0-LOWER BOUNDS RANGE STATUS ONLY (TRUE) | X X | 0 1 | 0 1 |
| | | 1-UPPER BOUNDS RANGE STATUS ONLY (TRUE) | 0 1 | X X | 0 1 |
| | | 2-BOTH UPPER AND LOWER BOUNDS RANGE STATUS (BOTH TRUE) | 0 0 1 1 | 0 1 0 1 | 0 0 0 1 |
| | | 3-BOTH UPPER AND LOWER BOUNDS RANGE STATUS (AT LEAST ONE TRUE) | 0 0 1 1 | 0 1 0 1 | 0 1 1 1 |
| | | IGNORE BOTH | X | X | 1 |

Fig. 9

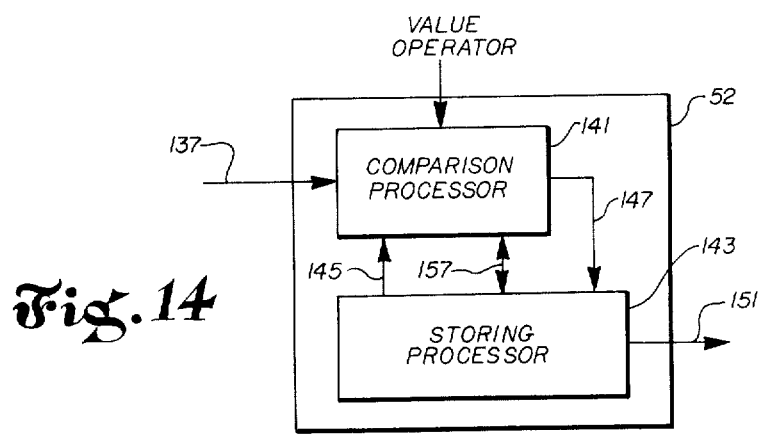

ONE-PASS GENERAL ASSOCIATIVE SEARCH PROCESSOR

BACKGROUND OF THE INVENTION

The present invention relates generally to the field of computer devices, and more specifically concerns a device for retrieving the particular one or more records from a data base comprising a large number of stored records which best satisfy a search specification established by a digital computer.

In U.S. Pat. No. 3,906,455 titled "Associative Memory Device", which has the same named inventor, and is assigned to the same assignee, as the present invention, apparatus is disclosed and claimed which is responsive to a request from a digital computer to locate and retrieve data stored in peripheral memory. Data is stored in peripheral memory in the form of logical records, which are in turn comprised of a number of data fields. The logical records are actually stored in data tracks which are individually addressable.

The retrieval process disclosed and claimed in the U.S. Pat. No. 3,906,455 uses a search specification, established by the digital computer, which designates one or more data fields as range fields and may designate one data field as a value field. Any particular field in a logical record may be a range field or a value field (the value field can also be range tested), depending on the search specification established by the digital computer. The search specification also establishes range field values and range field operators which are applied against the range fields, and perhaps the value field, of each logical record, and a value operator which is applied against the value field of each logical record in the data base being searched.

The permissible range operators are: (1) greater than; (2) less than; (3) greater than or equal to; (4) less than or equal to; (5) equality; and (6) inequality. One or two designated range operators are then used with the designated range value by the search apparatus against one selected range field (or the value field) in each logical record in the data base. All of the range tests are performed against one logical record before moving on to the next one.

The permissable value operators are: (1) greatest; and (2) least. The designated value operator for the value field is used by the search apparatus in its value field test of each logical record in the data base. A value test may or may not be specified, depending on the particular search specification being implemented. The particular record or records which best satisfy the range and value tests (if specified) are then returned to the using computer. A search of all the logical records comprising a data base in accordance with the search specification established by the digital computer is referred to as a general associative search. The structure and operation of the search apparatus which is capable of performing a general associative search, such as that discussed above, are disclosed in more detail in the U.S. Pat. No. 3,906,455.

In the U.S. Pat. No. 3,906,455, the peripheral memory comprising the area to be searched is disclosed to be divided into groups of data tracks, referred to as track groups. Referring now to FIG. 1 of the present invention, a plurality of data tracks 20—20 comprise a peripheral memory shown generally at 22. Peripheral memory 22 may be a conventional rotating disc or drum, or a more advanced peripheral memory, such as a Block Oriented Random Access Memory (BORAM), which is disclosed in the U.S. Pat. No. 3,906,455.

Peripheral memory 22 is divided into two track groups 24—24, which each comprise 16 data tracks. An actual data base which is to be searched may comprise several peripheral memories or may comprise a portion of a peripheral memory. In the process of the associative search described in the U.S. Pat. No. 3,906,455, the individual track groups 24—24 comprising a peripheral memory are processed in sequence by the search apparatus which comprises a plurality of subgroup processing elements 28—28 and a combinational processor 34. Combinational selector 26 hence applies each track group 24 in turn to the search apparatus. The data tracks 20 comprising each track group, however, are processed simultaneously.

Each track group 24 is further divided into a number of track subgroups. The data tracks comprising each track subgroup are simultaneously applied to one subgroup processing element 28, which searches the logical records in each data track in accordance with the search specification established by using digital computer 32 and stored in search specification control unit 30.

Each of the subgroup processing elements 28 search a specified number of data tracks. Each subgroup processing element 28 passes the result of its search (i.e., the record in the subgroup best satisfying the search specification) to combinational processor 34. Combinational processor 34 comprises a plurality of individual processors, described in detail in the U.S. Pat. No. 3,906,455, which continuously receive the search results from all the subgroup processing elements 28—28, and the results of processing other subgroups in a particular track group, and then from successive track groups, to determine the best record in each track group, each peripheral memory, and finally in the data base. The best record in the data base is then returned to using computer 32 in response to its original search specification.

In such a search, the value test (which uses either a "least" or "greatest" value operator) can only be performed after all of the range tests have been completed. Since the particular data field against which the value test is to be performed may be any data field in the entire logical record, the apparatus of FIG. 1 must necessarily process each logical record twice to complete an associative search. In the first pass of data, the range tests are completed; in the next pass the value test (if one is specified) is completed. Such a two-pass process necessarily increases the time necessary for a search, and correspondingly decreases the efficiency of the search apparatus.

Additionally, it is often desirable to terminate a search after the first record is retrieved which satisfies the search specification. With the two-pass processor, something more than one complete pass of the data will usually be necessary (i.e. unless there is no value test), even if there existed means for terminating the search when the first record is found.

The problem of two-pass searching is significantly aggravated in the case where more than one record equally satisfies the search specification and all such records must be returned to the using computer. This is referred to in the art as a multiple match. The greater the number of matches in a particular data base, the more time the search requires, due to the necessity of at least one full pass of the data for each record return. Each return requires one complete pass if only range tests are performed, and two complete passes if both range and value tests are performed.

Accordingly, it is a general object of the present invention to provide a subgroup processing element for use in the apparatus of FIG. 1 which overcomes one or more of the disadvantages of the prior art specified above.

It is an object of the present invention to provide such a processing element which is capable of completing both range and value tests in a single pass of the data.

It is another object of the present invention to provide such a processing element which is capable of processing more than one data track simultaneously.

It is a further object of the present invention to increase the speed of a general associative search.

It is yet another object of the present invention to provide such a processing element which can perform a value test on a value field in a given logical record while concurrently maintaining the status of range tests previously performed on range fields in the given logical record.

It is a still further object of the present invention to provide such a processing element which may be successfully used both with conventional peripheral memories and/or Block Oriented Random Access Memories (BORAM).

It is an additional object of the present invention to improve the efficiency of the associative search apparatus.

It is another object of the present invention to provide such a processing element which is capable of terminating a search when a record satisfying the serch specification has been found.

It is a further object of the present invention to provide such a processing element which keeps track of multiple matches.

SUMMARY OF THE INVENTION

Accordingly, the present invention is an apparatus for searching data which has been previously stored as a sequence of logical records on one or more data tracks. The search is carried out in accordance with a search specification originated by a digital computer, the search specification including first and second test criteria which in operation are applied, respectively, against first designated data and second designated data in each logical record in the sequence. The first and second test criteria are such that the first designated data in each logical record must be completely searched using the first test criteria before the second designated data can be searched using the second test criteria. The apparatus includes (1) a first processor which further includes at least one first subprocessor for evaluating the first designated data in each logical record in the sequence thereof on one data track with the first test criteria, (2) a device for recognizing the second designated data in a given logical record during the time that the first designated data of the given logical record is being evaluated by the first processor, (3) a memory for storing a first signal produced by the first processor indicative of whether or not a given logical record has satisfied the first test criteria and further for concurrently storing the second designated data of the given logical record, (4) a second processor for evaluating the second designated data in each logical record with the second test criteria, and (5) a comparison processor for comparing the results of a logical record just searched with all logical records previously searched by the apparatus in the data track, or other specified area being searched.

DESCRIPTION OF THE DRAWINGS

FIG. 4 is a diagram showing the functional data flow of the device shown in block form in FIG. 3.

FIG. 6 is a block diagram of the upper or lower bounds processor shown as a single block in FIG. 5.

FIG. 7 is a truth table showing the output of the element of FIG. 6 relative to various combinations of inputs thereto.

FIG. 8 is a block diagram showing in more detail the conjunction processor shown as a block in FIG. 5.

FIG. 9 is a truth table showing the output of the device of FIG. 8 relative to various combinations of inputs thereto.

FIG. 13 is a truth table showing the output of the device of FIG. 12 relative to various combinations of inputs thereto.

FIG. 14 is a block diagram showing in more detail the intermediate result processor element shown as a block in FIG. 3.

DESCRIPTION OF THE PREFERRED EMBODIMENT

Figure 1:
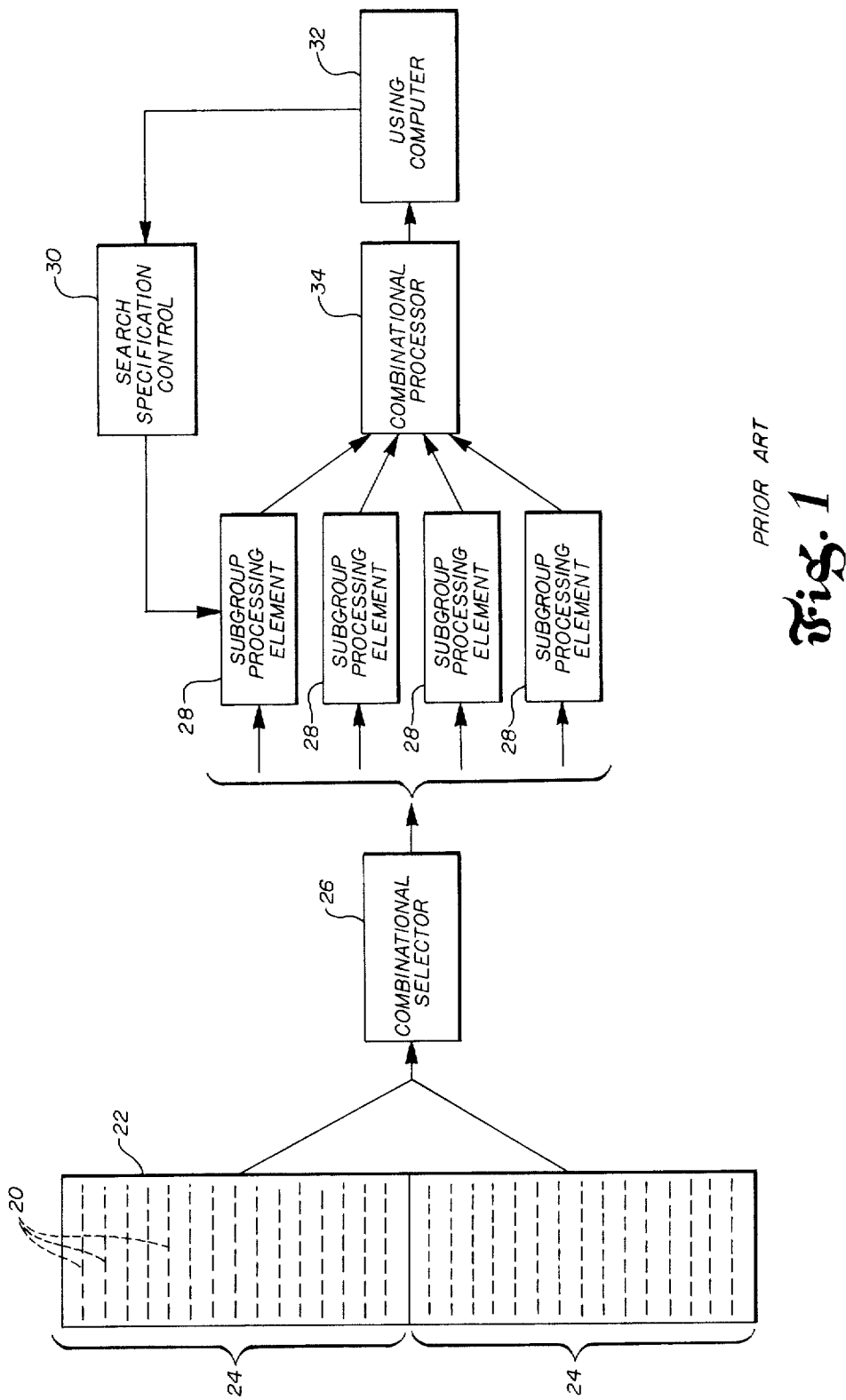
FIG. 1 is a block diagram of an apparatus for performing an associative search, showing the relationship between a using computer, a search apparatus, and a peripheral memory.

Referring now to FIG. 1, the generalized structural environment for the subgroup processing element of the present invention is shown. As in the prior art, a search specification originated by using computer 32 is applied to a search specification control section 30, which stores the search specification and subsequently uses it to control the operation of subgroup processing elements 28—28.

Each subgroup processing element 28 is operative to search the logical records stored in sequence in the particular data tracks 20—20 which are applied to it by combinational selector 26. The present invention is a new subgroup processing element which is a substitute for subgroup processing element 28 and which simultaneously processes a selected number of data tracks in one pass of the data.

Figure 2:
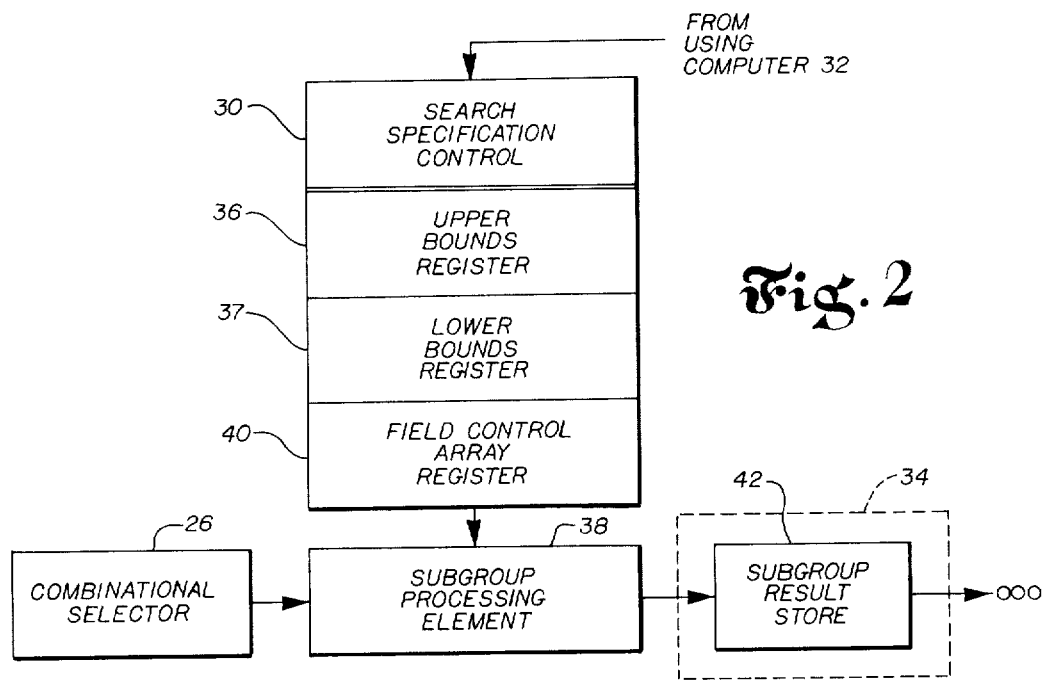
FIG. 2 is a block diagram showing a portion of the apparatus of FIG. 1 in more detail, including the subgroup processing element of the present invention.

Referring now to FIG. 2, the search specification originated by the using digital computer 32 comprises several components which are subsequently stored in corresponding parts of search specification control section 30. They include an upper bounds register 36, a lower bounds register 37, and a field control array register 40. The search specification components are used in a manner described in detail below to control the operation of the subgroup processing element of the present invention 38, as it receives data in the form of sequences of logical records stored in a number of data tracks applied by combinational selector 26. The results of each subgroup processing element 38 are passed to subgroup result store element 42, which forms a part of combinational processor 34.

Each register in search specification control section 30 is sufficiently large to accommodate search specification components for each of the data fields comprising a logical record of the type to be searched. The search components in the upper and lower bounds registers 36 and 37 are numerical values. The search component in the field control array register is a code which specifies the manner in which the numerical values in the upper and lower bounds registers 36 and 37 are applied against a particular data field, thereby defining a particular range or value test for that data field. In the range test for "greater than", for instance, the code in the field control array will represent "greater than" with respect to the numerical value in the lower bounds register 37, and "ignore" with respect to the numerical value (if any) in the upper bounds register 36. No numerical values are used in a value test as the search is always for "greatest", or "least", and hence any values in registers 36 and 37 would be ignored.

The components of search specification control section 30 are applied to each subgroup processing element 38 of the present invention for processing of the logical records in the data tracks presented to it. The one or more record(s) from all the logical records in a particular subgroup which best satisfies the range and value tests is passed to a subgroup result store element 42 from subgroup processing element 38. Subgroup result store element 42 stores both the value field and the address of the best record. Combinational processor 34, of which subgroup result store element 42 is a part, is operative to combine results from other subgroup processing elements 28, then from other track groups, and finally from other peripheral memories, which in total comprise the data base being searched, to identify the best record(s) from the entire data base. These record(s) are then returned to the using computer 32.

Figure 3:
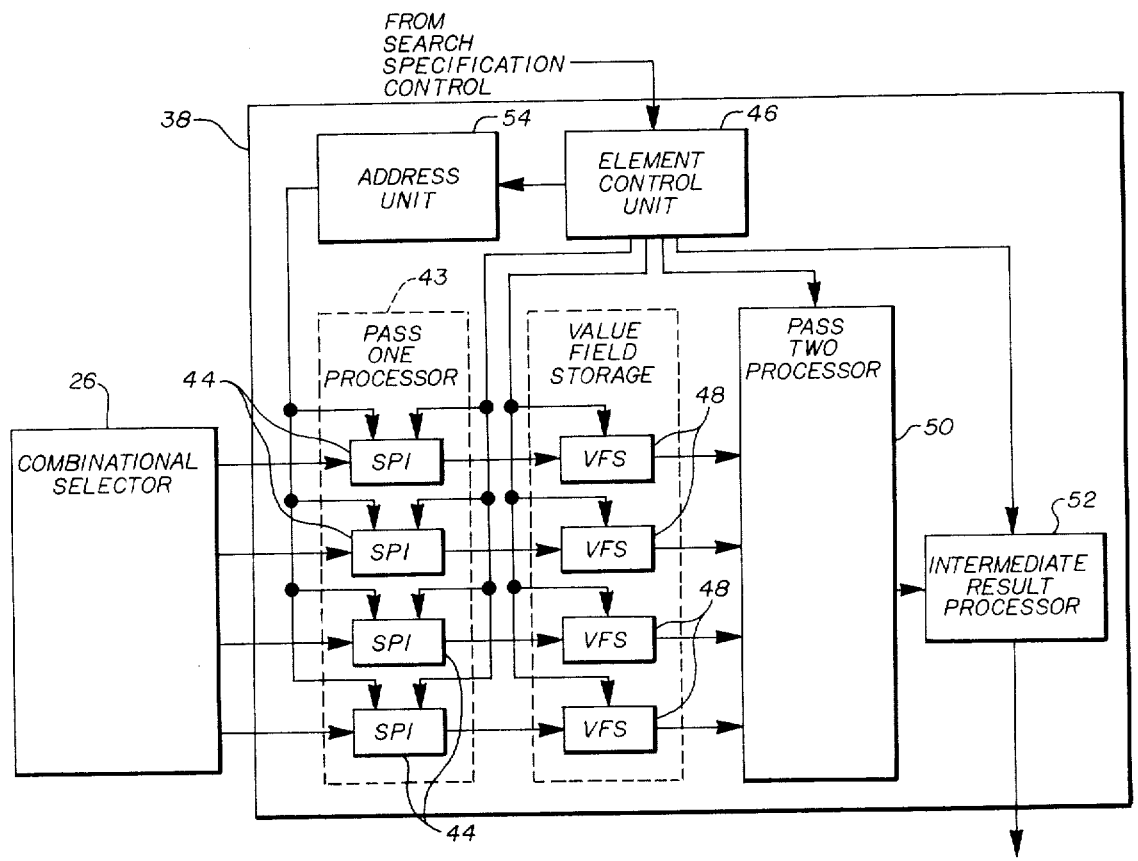
FIG. 3 is a block diagram showing in more detail the subgroup processing element of the present invention shown in block form in FIG. 2.

FIG. 3 shows a generalized block diagram of the subgroup processing element 38 of the present invention, which overcomes one or more of the disadvantages of the prior art stated above, and is operative to accomplish the objects stated above. A single data track subgroup, comprising a predetermined number of data tracks, is passed to the input of a pass-one processor 43 by combinational selector 26. Pass-one processor 43 comprises a plurality of pass-one subprocessors 44—44, one for each data track in a single track subgroup. It should be understood that the number of pass-one subprocessors 44 may be varied in accordance with the design considerations which determine the number of data tracks in a data track subgroup.

Each pass-one subprocessor 44 performs the range tests on the sequence of logical records in the data track applied at its input. The range operators and range values which together form range test criteria are supplied from search specification control section 30 through element control unit 46, which is included in each subgroup processing element 38.

Each of the pass-one subprocessors 44 has associated therewith a value field storage element 48. Value field storage element 48 stores both the data in the value field of the logical record being evaluated by its associated pass-one subprocessor 44, and a signal indication of whether or not the logical record being evaluated has satisfied the range tests.

After each logical record has been completely processed by the pass-one subprocessor 44, the signal indication of the success or failure of its range tests and the data in its value field is stored in a value field storage element 48. This data for the one just-processed record from each of the several value field storage elements 48—48 is then applied to a pass-two processor 50, which tests the value field data from each value field storage element 48—48 by the designated value operator, referred to as the value test criteria, from field control array register 40.

The pass-two processor 50 passes to the intermediate result processor 52 the actual value field of the one record from those simultaneously applied thereto which satisfies the range tests and best satisfies the value tests. Accompanying the value field is a signal indicating that the record has passed the range tests.

The intermediate result processor 52, which follows pass-two subprocessor 50, then compares the just-received record from the pass-two processor 50 with the previous best record from the subgroup, and the better record of the two is then stored in the intermediate result processor 52 for future comparison with results from pass-two processor 50.

Pass-one subprocessors 44—44, value field storage elements 48—48, pass-two subprocessor 50, and intermediate result processor 52 are all under the control of element control unit 46, which will be explained in more detail hereinafter. The structure and operation of address unit 54, which assists in the control of the pass-one subprocessors, will also be explained in more detail hereinafter.

Referring now to FIG. 4, which shows the functional flow of data in the subgroup processing element of FIG. 3, assume for purposes of illustration that four data tracks A, B, C, D comprise a subgroup 56. Hence, there will be four pass-one subprocessors in the pass-one processor of subgroup processing element 38. Furthermore assume, again for purposes of illustration, that data tracks A, B, C and D each comprise six complete logical records. If the individual data tracks A, B, C and D are aligned such that their start boundaries are linearly coincident, then the start and stop boundaries of successive logical records in each data track will also be coincident, as shown pictorially in FIG. 4.

Four coincident logical records (e.g. records 4a–4d in FIG. 4) from the respective data tracks form what is referred to as a record frame. Each record frame is processed simultaneously by the pass-one processor, with each logical record in each record frame being processed by its corresponding pass-one subprocessor. Thus, in the processing of data tracks A-D of FIG. 4, record frames 1–6 are processed in sequence, with the four logical records in each successive record frame being processed simultaneously.

In operation, each pass-one subprocessor 44 performs the specified range tests against each designated range field (which could include the designated value field) in the one logical record which is being evaluated, for example, record 4d in FIG. 4. When the value field is recognized, it is stored in a first portion of one section 48a of value field store element 48. Pass-one subprocessor 44 also applies a signal to element 48, the signal being referred to as a range status indicator, which is continuously updated through evaluation of each record, and indicates whether or not the designated range fields processed to that point in each record have satisfied the range tests.

The range status indicator is stored in section 48b of value field store element 48. When processing of each record is complete, a first portion of section 48a contains the value field data and a first portion of section 48b contains the range status indicator for a given record. Pass-one subprocessor 44 then proceeds to process the next logical record in the data track, using a second portion of sections 48a and 48b.

While the pass-one subprocessor is actually using the second portions of section 48a and 48b for current processing of a record, the information already stored in the first portions thereof from the previously processed record is advanced into pass-two subprocessor 50, along with information from the other value field store elements 48—48 for the corresponding logical records (e.g. records 4a-4c in FIG. 4) of record frame 4. The flow of data into and out of value field store element 48 thus alternates between the first and second portions of both storage sections 48a and 48b.

Following processing by pass-two processor 50, intermediate result processor 52 compares the results from pass-two processor 50 with the best logical record processed to date in the subgroup. Referring to FIG. 4 for illustration, when the best record from frame 4 of data tracks A, B, C and D is applied to intermediate result processor 52, it is compared with the best record from frames 1-3. The better of the two records is then stored for comparison with the best record from the following frames (i.e. frames 5-6 in FIG. 4). When all of the record frames in the subgroup have been processed, the one record stored in intermediate result processor 52 will be the record in the subgroup which best satisfies both the range and value tests. The best logical record in the subgroup is then passed to the combinational processor 34 (FIG. 1), which eventually identifies the best record in the entire data base for return to the using computer.

Figure 5:
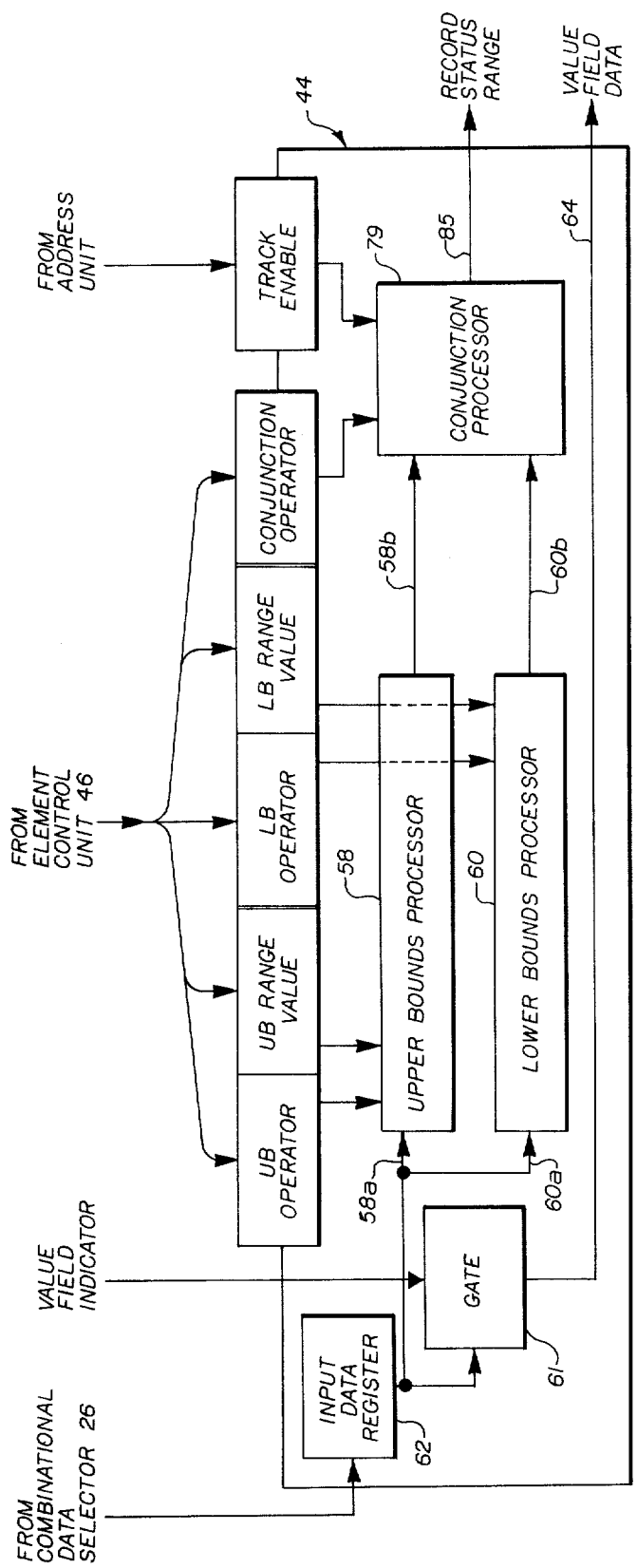
FIG. 5 is a block diagram of one of the pass-one subprocessors shown in block form in FIG. 3.

Referring now to FIG. 5, a single pass-one subprocessor 44 is shown in detailed block diagram form. The upper bounds (UB) range field value and range field operator (which form part of the range test criteria) for the particular range field (which may include the field designated as the value field) being processed in the one logical record being evaluated is distributed by element control unit 46, as is the lower bounds (LB) range field value and range field operator (which form the other part of the range test criteria).

The UB range field value and range field operator are used by upper bounds processor 58 to test the data in the particular range field being processed. The lower bounds processor 60 operates in the same manner against the same range field, using the lower bounds range field value and range field operator.

An input data register 62, controlled by element control unit 46 advances the data of the particular data field being processed simultaneously into the upper and lower bounds processors 58 and 60. It does this on what is referred to as a slice-by-slice basis. A data slice is some fraction of the total data in a data field. The data in each data field of a logical record is arranged from most significant to least significant, as is the upper/lower bounds range field values distributed by element control unit 46.

Such an arrangement enables a valid range test to be performed on each field without testing all of the data therein. Hence, the data in each field is tested slice-by-slice against similar slices of range field values distributed by the element control unit 46. Often, a decision as to whether or not a particular range field satisfies the range tests can be made before all of the data in the particular range field is actually tested. This procedure saves a considerable amount of time.

In the present invention, the data slice is four bits, although it could easily be greater, or fewer. Hence, in the present invention, four bit data slices of a particular field are supplied, slice by slice, over lines 58a and 60a to upper bounds processor 58, and lower bounds processor 60, respectively, from input data register 62. The advance of data slices of the range field values distributed by element control unit 46 and the corresponding data slices from the particular field being processed from input data register 62 are synchronized by element control unit 46 so that the same relative data slices for the same range fields are simultaneously presented for comparison in the upper bounds and lower bounds processors 58 and 60.

In operation, data from input data register 62 is supplied continuously to upper bounds and lower bounds processors 58 and 60, and to a gate 61. Gate 61 is controlled by a value field indicator signal from element control unit 46.

This signal is initiated when the field designated as the value field in the logical record being evaluated is ready to be advanced to upper and lower bounds processors 58 and 60. The value field indicator signal sets gate 61 so that the value field data is applied over line 64 directly to the output of pass-one subprocessor 44, for application to its associated value field storage element 48. The value field is also, however, applied to upper bounds/lower bounds processors 58 and 60 for range test processing, if so specified by the search specification. As soon as the value field data has passed through gate 61, the value field indicator signal is terminated.

Referring now to FIG. 6, upper bounds processor 58 is shown. It should be understood that lower bounds processor 60 is identical and hence is not shown or described in detail. In operation, the actual data slice from input register 62 is applied over line 58a to a conventional comparator 68, which compares the numerical value of the actual data slice with the numerical value of the corresponding slice of upper bounds range value supplied over line 66.

Comparator 68 generates an output signal (e.g. binary coded) which indicates whether the actual data slice is greater than, less than, or equal to, the upper bounds range value slice. In the embodiment shown and described, comparator 68 comprises a standard 4 bit comparator with a binary encoder, both of conventional construction. Comparator 68 generates three binary outputs, 0, 1, and 2, each output corresponding to one of the three comparison results specified above.

The output signal from comparator 68 is applied as one input to a logic unit 72, along with the upper bounds range operator distributed by element control unit 46 over line 69, which will be a coded representation of the selected one of the possible range operators, i.e. either greater than, greater than or equal to, less than, less than or equal to, equality, inequality, and ignore.

Logic unit 72 in operation tests the output signal from comparator 68 against the upper bounds range operator coded signal and generates a true/false output indicating whether the actual data slice either satisfied or failed the test. If the test is successful, subsequent slices of actual data are tested. This process continues until each data field, and hence eventually the entire logical record, is range tested.

At the start of range testing each logical record, a two-state element referred to as a range status indicator 74 is set to a valid (i.e. binary one) condition by a start record indication signal from element control unit 46 on line 71. The output of range status indicator 74 is supplied both as an output of upper bounds processor 58 over line 58b and as an additional input to logic unit 72.

As long as the output from logic unit 72 remains true, the output of range status indicator 74 remains valid. However, when any particular data field in a logical record fails the range test, the output of logic unit 72 changes to false, which in turn alters the condition of range status indicator 74 to invalid (i.e. binary zero). The invalid condition of indicator 74 in turn maintains the output of logic unit 72 false, which further in turn maintains the range status indicator's condition invalid.

If one data field in a given logical record fails the range test, the upper range status signal on line 58b remains invalid throughout the remainder of the record. If all of the range fields in a record pass the range tests, however, then the output of range status indicator 74, and hence the upper range status signal on line 58b, remain valid.

The device shown in FIG. 6 implements the truth table shown in FIG. 7. If the range status signal is zero (invalid), then the values of the range operator and the comparator output are irrelevant (X indicates a no-care condition); the resulting range status signal will remain zero. If the condition of range status indicator 74 is one (valid), however, then logic unit 72 will test the results of comparator 68 with the range field operator. As seen in FIG. 7, comparator 68 has three possible outputs, depending on the numerical values of the inputs thereto. There are four possible upper bounds range field operators. Each combination of comparator outputs and range field operators will result in a particular effect on the condition of range status indicator 74, as shown in the table of FIG. 7.

The truth table for the lower bounds processor 60 will be substantially identical to that shown in FIG. 7 for the upper bounds register, except that the range field operators will include "greater then" and "greater than or equal to", instead of "less than" and "less than or equal to".

The outputs of upper and lower bounds processors, on lines 58b and 60b are thus either true or false, and respectively indicate, on a slice-by-slice basis, whether or not the record being evaluated has to that point satisfied both the upper bounds and lower bounds range tests. These outputs are passed to a conjunction processor 79.

Referring now to FIG. 8, which shows conjunction processor 79 in more detail, upper and lower bounds range status signals are applied as inputs on lines 58b and 60b, respectively, to a conjunction logic unit 76. Another input signal applied to conjunction logic unit 76 on line 81 from a track enable unit 80, which is under the control of a track enable indication signal from address unit 54, is either a one (valid) or a zero (invalid), indicating whether or not the particular data track being processed contains valid data for evaluation. If the signal is invalid, processing is minimized.

Still another input to conjunction logic unit 76 is the conjunction operator, distributed by element control unit 46 on line 82. The conjunction operator specifies which of the upper and lower bounds range status signals on lines 58b and 60b are to be tested for validity, so as to implement the overall range test specified in the search specification. For example, if the using computer specified a "greater than" range test for a particular data field, the conjunction operator on line 82 would specify testing only of the lower bounds range status signal on line 60b. The other upper bounds range status signal would be ignored. If the using computer specified an actual range of values, having both upper and lower bounds, then both upper and lower bounds range status signals would be tested for validity.

Conjunction processor 79 also includes a two state element referred to as a record range status indicator 87, which is set to one (valid) at the start of each record by the start record indication signal from element control unit 46. A signal indicative of the condition of record range status indicator 87 is applied on line 85 (referred to as a record range status signal) as an input to a value field storage element 48, and on line 83 as another input to conjunction logic unit 76.

The condition of record status indicator 87 remains at one (valid) as long as the conjunction operator tests are satisfied. As soon as the inputs on lines 58b and 60b fail the conjunction operator test, however, the output of record range status indicator 87 changes to zero (invalid) where it remains from the remainder of the record, because of the invalid signal input to conjunction logic unit 76 on line 83.

Conjunction logic unit 76 implements the truth table of FIG. 9, which relates the condition of the record range status signal on line 85 to the various inputs to conjunction logic unit 76. There are, in the embodiment shown and described, five possible conjunction operators: (1) the first specifies that only the lower bounds range status is to be tested (test for true); (2) the second specifies that only the upper bounds range status is to be tested (test for true); (3) the third specifies that both the upper and lower bounds range status signals are to be tested (test for both true); (4) the fourth specifies that both the upper and lower bounds range status signals are to be tested (test for at least one true); and (5) the fifth specifies that both the upper and lower bounds range status signals are to be ignored.

The column at the far right in FIG. 9 is the resulting record range status signal, which is applied on line 85 to a value field store element 48. When the record range status signal is valid (one) the record being processed has to that point satisfied the range tests; a zero indicates that the record has failed the range tests.

Figure 10:
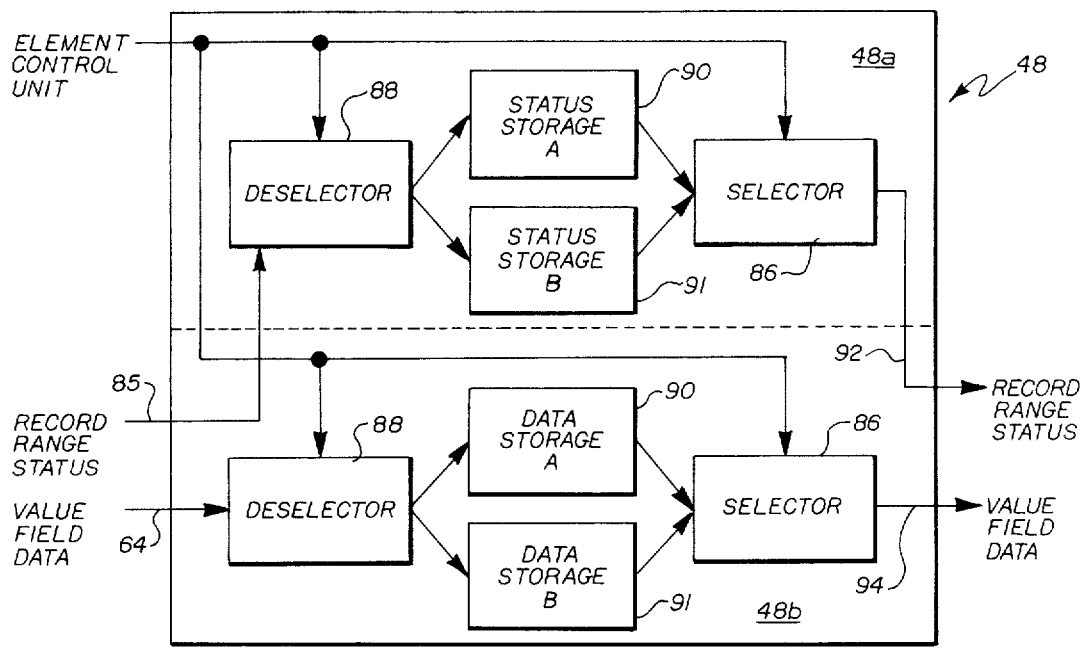
FIG. 10 is a block diagram showing in more detail the value field storage element shown as a block in FIG. 3.

The record range status signal on line 85 and the actual value field data on line 64 (FIG. 5) from a single pass-one subprocessor 44 are applied as inputs to a single value field store element 48, which is shown in more detail in FIG. 10. Value field store element 48 is divided into two sections 48a and 48b. Section 48a comprises storage for the record range status information applied on line 85, and section 48b comprises storage for the value field data applied on line 64.

Each section 48a, 48 b comprises a selector unit 86, a deselector unit 88, and two storage elements 90, 91.

Selectors 86 and deselectors 88 are controlled by element control unit 46. Typically, selectors 86 are conventional multiplexers while deselectors 88 are demultiplexers. The record range status signal on line 85 is applied as an input to deselector 88 of section 48a, while the value field data on line 64 is applied to deselector 88 of section 48b.

In operation, deselector 88 of each section 48a, 48b will select the cleared one of its two storage elements 90, 91 to receive the data coming in over lines 85 and 64 from the record currently being evaluated slice-by-slice by a pass-one subprocessor 44.

The record range status signal and value field data from the last completely processed record is present in the other storage element in each section, and is cleared out of that storage element through selector 86 for passage to the pass-two processor, during the time that the record range status signal and value field data for the current record is being advanced into the previously cleared storage element in each section. Hence, the data applied to the pass-two processor is on a record-by-record basis.

During processing of the data tracks, the selectors and deselectors 86 and 88 alternate between the two storage elements 90, 91 in each section 48a, 48b. The record range status signal and the value field data for a completely processed record are thus cleared alternately from storage elements 90 and 91 in each section, and are applied on lines 92 and 94, respectively, to pass-two processor 50.

Figure 11:
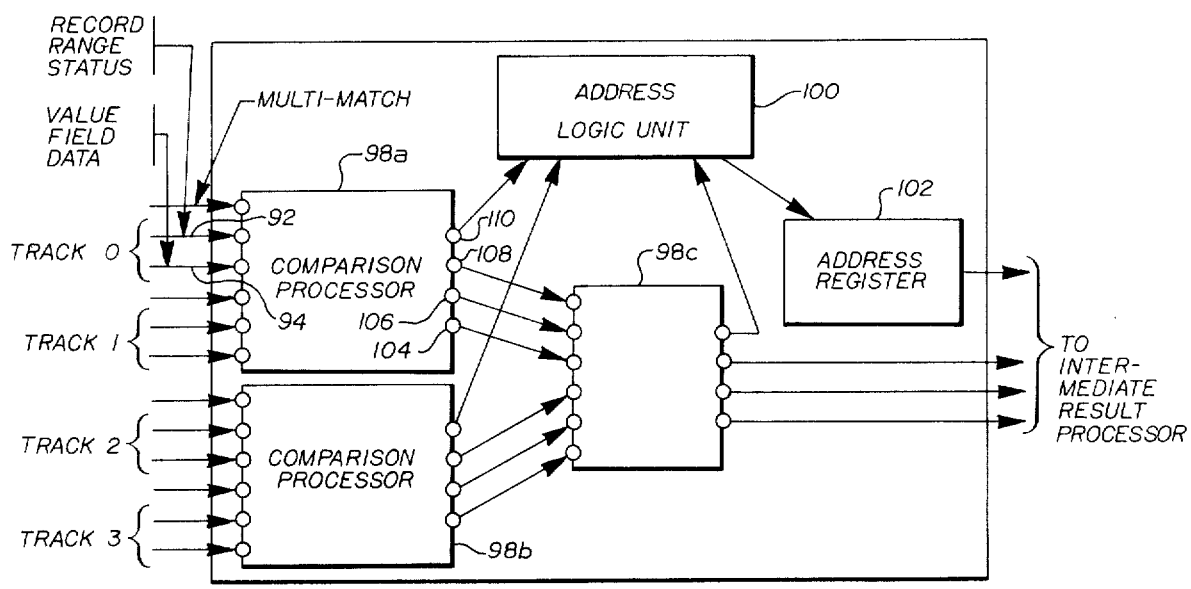
FIG. 11 is a block diagram showing in more detail the pass-two processor shown as a block in FIG. 3.

FIG. 11 shows, in general block diagram form, the structure of the pass-two processor 50, which is responsible for testing the value field in each record with the value test criteria, i.e. the designated value operator. There is one pass-two processor in each subgroup processing element 38 (FIG. 3).

The pass-two processor shown generally at 50 in FIG. 11 comprises a variable number of comparison processors 98, depending on the number of data tracks comprising the subgroup. With four data tracks, the three comparison processors 98a - 98c of FIG. 11 are necessary. The comparison processors are arranged in a series of descending tiers, forming a tree-like combination.

Pass-two processor 50 also includes an address logic section referred to as tag generating logic unit 100, which is followed by an address register 102. The results of pass-two processor 50 are applied to an intermediate result processor 52 (FIG. 3), the structure and operation of which will be described hereinafter.

Referring still to FIG. 11, each comparison processor 98 in pass-two processor 50 has two input sections, each input section accommodating three data inputs for one record from a specified data track. The first input in each section is the record range status signal, the second input is the value field data and the third input is the multiple-match indicator signal.

Comparison processors 98a-98c in FIG. 11 are arranged in a tier fashion so that sufficient comparisons may be made to determine the best record in each record frame. The total number of comparison processors in the pass-two processor depends, as stated above, on the number of data tracks in a subgroup, and hence the number of records comprising a record frame. Since each comparison processor 98 is capable of selecting the better of two input records, each tier of comparison processors will result in a division by two of the records comprising a frame. To provide the one best record in the record frame, three comparison processors are necessary for a four-record frame, seven comparison processors are necessary for an eight-record frame, and so forth.

In operation, comparison processor 48 compares the value field data of range-valid input records, selects the better of the two, if they are not equal, and then passes both the record range status signal and the value field data for the better record to its output, from where it is either passed on to the next tier of comparison processors, or to the intermediate result processor.

In FIG. 11, for instance, output 104 of comparison processor 98a is the value field data for the better record of its two inputs (track 0 and track 1); output 106 is the record range status signal for the better record; output 108 is the multiple match indicator (binary one if two or more records test equal, zero if not); and output 110 is an address indicator (either a zero or a one, depending on which of the two records is the better) of the better record. In the case of a multiple match, the input record having the lowest address would be specified by the address indicator. The output data of a comparison processor, i.e. the data on lines 104, 106, 108 and 110, is referred collectively hereinafter as comparison test data.

Referring to FIG. 11, the identical two-by-two comparison process also occurs in comparison processors 98b and 98c, ultimately resulting in selection of the single best record from those records comprising the record frame presented at the outset to comparison processors 98a and 98b. The comparison test data from the single best record in each successive record frame is then applied to intermediate result processor 52.

The address data (e.g. output 110 for comparison processor 98a) is applied to tag generating logic unit 100, which has a structure and operation similar to that disclosed in the U.S. Pat. No. 3,906,455. Briefly, in the absence of multiple matches, tag generating logic unit 100 receives the address indicator signal in the form of a zero/one from each comparison processor, indicating which one of the two record inputs thereto is the better. Tag generating logic section 100 is updated with the results of each tier of comparison processors. The particular data track containing the best record is then determined from the series of address indicators received from the comparison processors.

If there is no multiple match in the entire comparison process, then the address indicator from comparison processor 98c provides the final updating for tag generating logic unit 100. The number (0–3 in FIG. 11) of the data track identified therefrom is then stored in address register 102, from where it is subsequently transferred to intermediate result processor 52. In the case of a multiple match, tag generating logic unit 100 and hence address register 102 will maintain the data track number of the lowest address.

The operation of pass-two processor 50, and hence the individual comparison processors, is somewhat simplified if one or more of the record range status signals are invalid, which indicates that the corresponding record has not satisfied the range tests. It only one of the two input records to a given comparison processor is valid, then the record test data associated with that record is passed directly to the output of the comparison processor. If both record inputs to a comparison processor are invalid, then the record range status indicator output of the comparison processor is set to zero, making all other outputs of that processor irrelevant.

Figure 12:
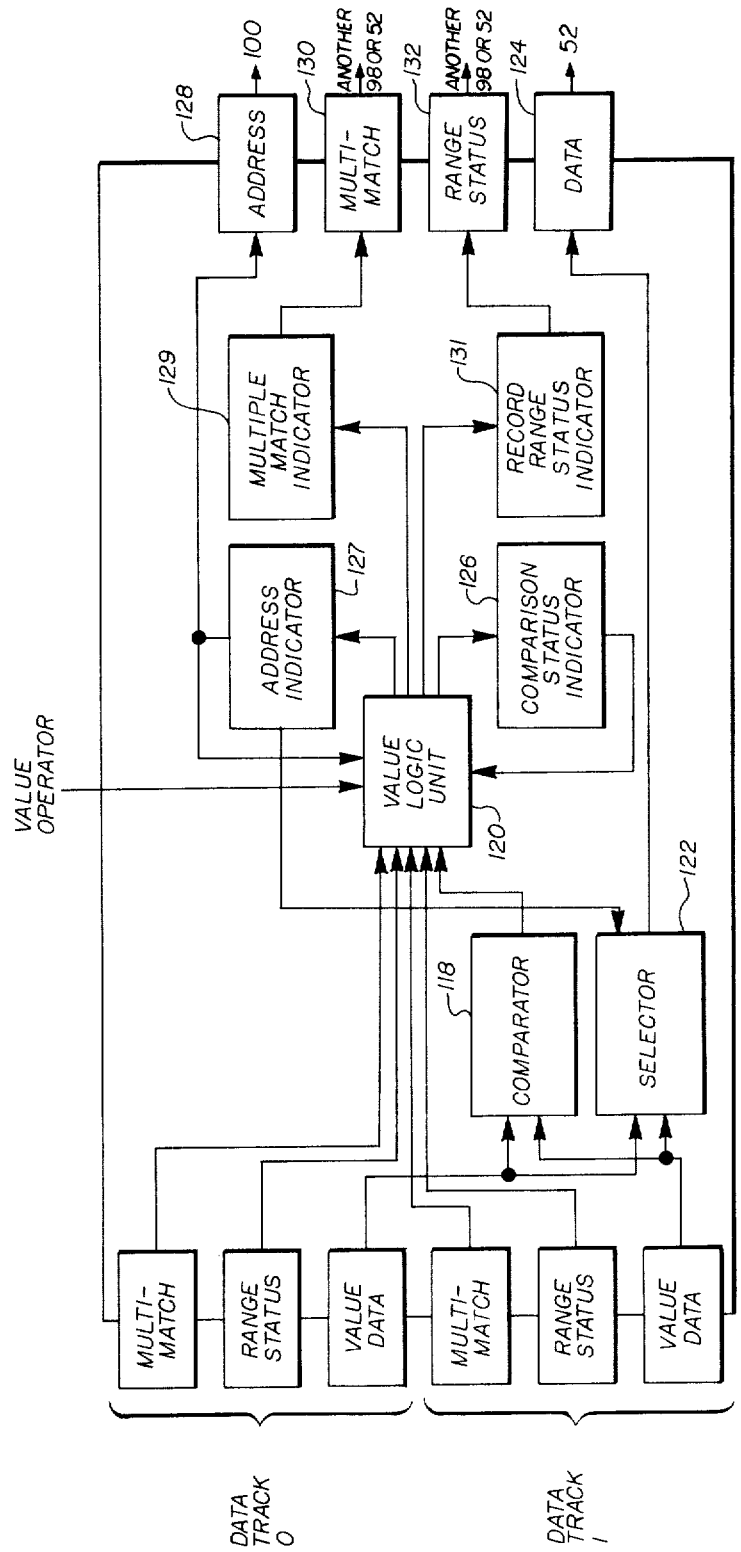
FIG. 12 is a block diagram showing in more detail the comparison processor shown as a block in FIG. 11.

The structure of a single comparison processor 98 is shown in detailed block diagram form in FIG. 12. In FIG. 12, the comparison test data (except the address indicator) relating to data tracks zero and one are applied as inputs, respectively, to the two input sections of a comparison processor 98. The value field data from data tracks zero and one are applied as inputs to a comparator 118 which is identical to the conventional comparator used in the pass-one subprocessors, and which operates on a slice-by-slice basis. The output of comparator 118 is again a binary number, and indicates whether the value field data of the record with the lower track address (track zero in FIG. 11) is either (1) equal to, (2) greater than, or (3) less than, the value field data of the record from the other track (track one in FIG. 11).

A value logic unit 120 operates on the results of comparator 118 with the value operator (either "greatest", "least", or "none") distributed by element control element 46, and hence determines, on a slice-by-slice basis, which record better meets the value test established by using computer 32.

At the start of each comparison, a two state element known as a comparison status indicator 126 is set to binary one, indicating that a decision has not yet been made between the two input records. The comparison and testing functions of comparator 118 and value logic unit 120 continue for the two value field data inputs until the comparator recognizes a difference between the two inputs. The difference is then tested by value logic unit 120 using the value operator, and selection of the better record is made. The condition of comparison status indicator 126 is then changed to a zero, indicating that a choice between the two input records has been made. This signal, when applied back to value logic unit 120 as an input, terminates further processing on those two records.

At this point (after a decision has been made), a two-state element referred to as address indicator 127 is set to indicate which record has been selected. A signal indicative of the condition of address indicator 127 is then applied to address output 128, from where it is passed to address logic unit 100. The condition of address indicator 127 also controls the operation of selector 122, which is a conventional simple selecting device which transmits the value field data of the better record to data output 124, from where it is passed to intermediate result processor 52.

Following selection of the better record, value logic unit 120, through two-state elements 129 and 131, transfers the multiple match signal and the record range status signal of the better record to outputs 130 and 132 respectively. If the value fields of the two records are equal, the multiple match indicator 129 is set to one, and the address indicator 127 indicates the lowest track address. Outputs 130, 132 and 124 are then applied over signal lines either to another comparison processor in a further tier of comparison processors, or alternatively, if the outputs represent the best record in the record frame, to intermediate result processor 52.

Occasionally, using digital computer 32 will not specify a value test, and hence the value operator will be "none". The results of the range test will then determine the output of the subgroup processing element, and the pass-two subprocessor is only used to control multiple matches.

Figure 13:
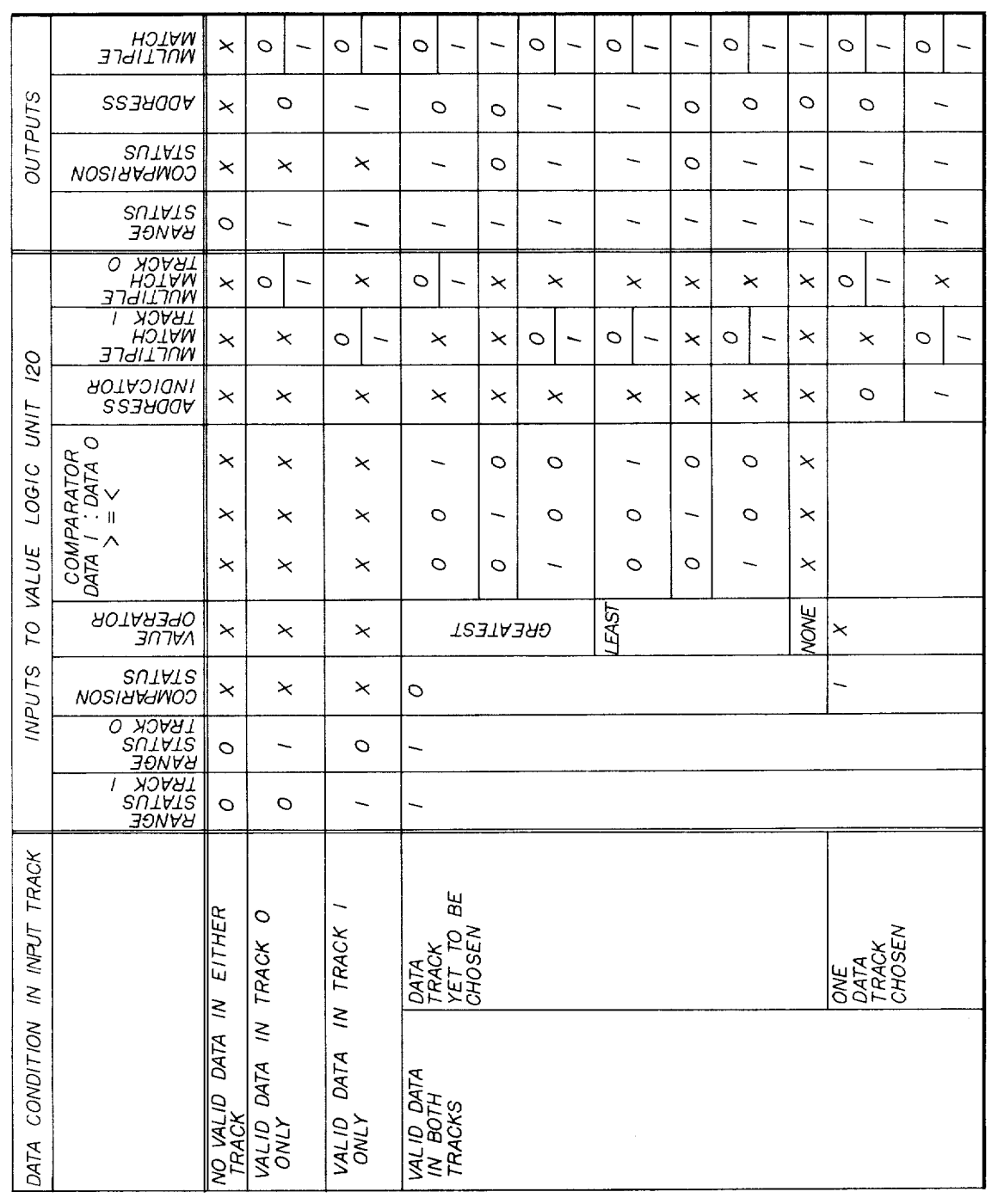

A truth table relating the data outputs of a comparison processor to various combinations of its inputs is shown in FIG. 13. The left section of the truth table specifies the various possible range status conditions of the data tracks, i.e. whether one or the other or both input records satisfies the range tests. The middle section lists all of the possible conditions of the inputs to value logic unit 120, including all three possible conditions of the output of comparator 118 explained above, relating to the value field data in each record. The right section shows the outputs of value logic unit 120 for the input combinations and record status combinations of the left and middle sections. The binary signal outputs shown in the right section of FIG. 13 as well as the actual value field data of the one best record in the record frame being processed at that time is then applied to intermediate result processor 52.

Referring now to FIG. 14, a general block diagram of the intermediate result processor 52 is shown. Intermediate result processor 52 includes (1) a comparison processor 141 which is identical to the comparison processors of the pass-two processor 50 discussed above, and (2) a storing processor 143. Comparison processor 141 receives comparison test data over a series of lines (i.e. from outputs 124, 128, 130, 132) from the last comparison processor in the pass-two processor 50, which lines are shown for convenience as a single line 137 in FIG. 14.

Comparison test data (minus address indicator) for the best previous record in the subgroup is supplied over a series of lines (shown in FIG. 14 as a single line 145) from storing processor 143, where the best previous comparison test data is stored. The best previous comparison test data on line 145 is compared with the comparison test data on line 137, and the comparison test data of the record having the better value field is applied back to storing processor 143 over line 147. Control signals pass between comparison processor 141 and storing processor 143 over line 157.

After the last record frame in the subgroup has been processed by the intermediate result processor 52, the comparison test data in storing processor 143 is for the record best meeting the range and value tests for the entire subgroup. This comparison test data is then passed on line 151 to a subgroup result storage element (not shown) which forms part of combinational processor 34 (not shown) of FIG. 1.

Combinational processor 34 is described in detail in the U.S. Pat. No. 3,906,455 and essentially comprises a plurality of known devices which are operative to compare the results of a plurality of subgroups, to then determine the best record in a particular track group, and then further to compare the results of a plurality of track groups. Those results of successive memories or devices are then compared, to determine the best record in the specified search area. The combinational processor 34, per se however, is not a part of the present invention.

Figure 15:
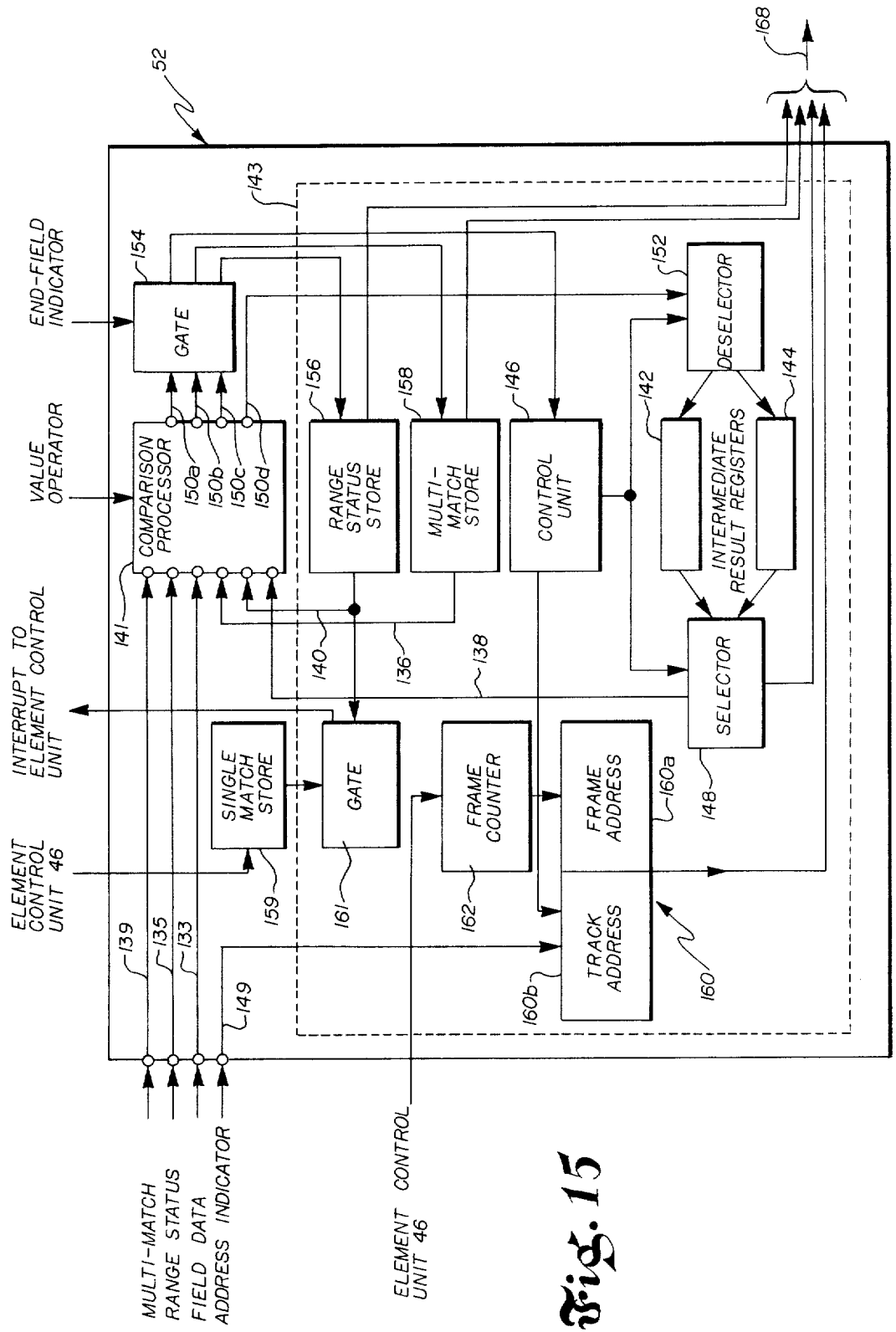
FIG. 15 is a detailed block diagram of the intermediate result processor shown in FIGS. 3 and 14.

Referring now to FIG. 15, the structure of the intermediate result processor 52 is shown in more detail. A comparison processor 141 receives comparison test data (minus the address indicator) from pass-two subprocessor 50 on lines 133, 135 and 139 and comparison test data (minus the address indicator) from storing processor 143 on lines 136, 138 and 140.

The value field data from the best previous record in the subgroup is stored in one of two intermediate result registers 142 and 144. The value field data from the best previous record is applied on line 138 through a selector (multiplexer) 148 which in turn is under the control of control unit 146. After the comparison of the two records is performed, in similar fashion to that described above with respect to the operation of a comparison processor in the pass-two processor 50, the comparison test data of the better of the two input records is passed to output lines 150a – 150d.

The value field data on output line 150d is applied through a deselector (demultiplexer) 152, which is also controlled by control unit 146, to the other of the two intermediate result registers 142, 144. If the record having its value field data applied on line 138 to comparison processor 141 is still the better record, then its value field data is again stored in the same intermediate result register 142 or 144 from which it was taken.

Output lines 150a – 150c are connected to a gate 154. Gate 154 is normally open, and is controlled by an end-field indicator signal from element control unit 46. This signal occurs at the end of each data field in a record. When gate 154 is closed, the data on output line 150a (address), output line 150d (multiple match) and output line 150c (record range status) are applied to, respectively, control unit 146, multiple-match store 158, and range status store 156.

At the beginning of the processing of each subgroup, range status store 156 and multiple match store 158 are both set to zero, indicating that there have been no multiple matches and no successful range-tested records discovered to-date. As soon as the processing of the first input record indicates valid range test information, range status storage 156 will change to one, and will remain there for the remainder of the record processing of the subgroup, as long as one record has satisfied the range tests. Likewise, as soon as a multiple match is discovered, multiple match storage 158 will go to one and will stay there until a better record breaking the multiple-match situation is found.

Control unit 146 controls the operation of deselector 152 and selector 148, and also updates address register 160 which contains the address of the best record to data in the subgroup. Address register 160 comprises a frame address section 160a responsive to a frame counter 162, and a track address section 160b. Frame counter 162 is controlled by element control unit 46 which clears frame counter 162 at the beginning of each subgroup, and then increments it as each successive frame of records is processed. Frame counter 162 thus always contains the frame number of the comparison test data being applied to intermediate result processor 52 from the pass two processor 50. Track address section 160b is responsive to the address indicator signal on line 149 from the pass-two processor, and to the signal from control unit 146. Address register 160 thus is updated by the address indicator on line 149 and the signal from frame counter 162 when the record represented by the comparison test data on lines 133, 135 and 139 is the better record of the two inputs to comparison processor 141.

Upon completion of the processing of all of the individual records in a subgroup, the comparison test data for the best record is provided to the output of the intermediate result processor on a number of output lines, shown collectively as line 168 in FIG. 15. This comparison test data is passed to follow-on elements i.e. additional elements in combinational processor 34, for further processing, as explained above.

Occasionally, it may be that using digital computer 32 will not need all the records which satisfy the range and value field criteria, i.e. the first satisfactory record is sufficient. In such a case, the search should be terminated at that point. To implement this termination capability, a two-state element known as a single match indicator store 159 is initially set to binary one by element control unit 46. The binary one output from single match indicator 159 is applied as an input to an AND gate 161 along with the output from range status store 156. When both inputs are binary one, the one output of AND gate 161 is applied as an interrupt to element control unit 46, which terminates further processing by the subgroup processing element 38.

Figure 16:
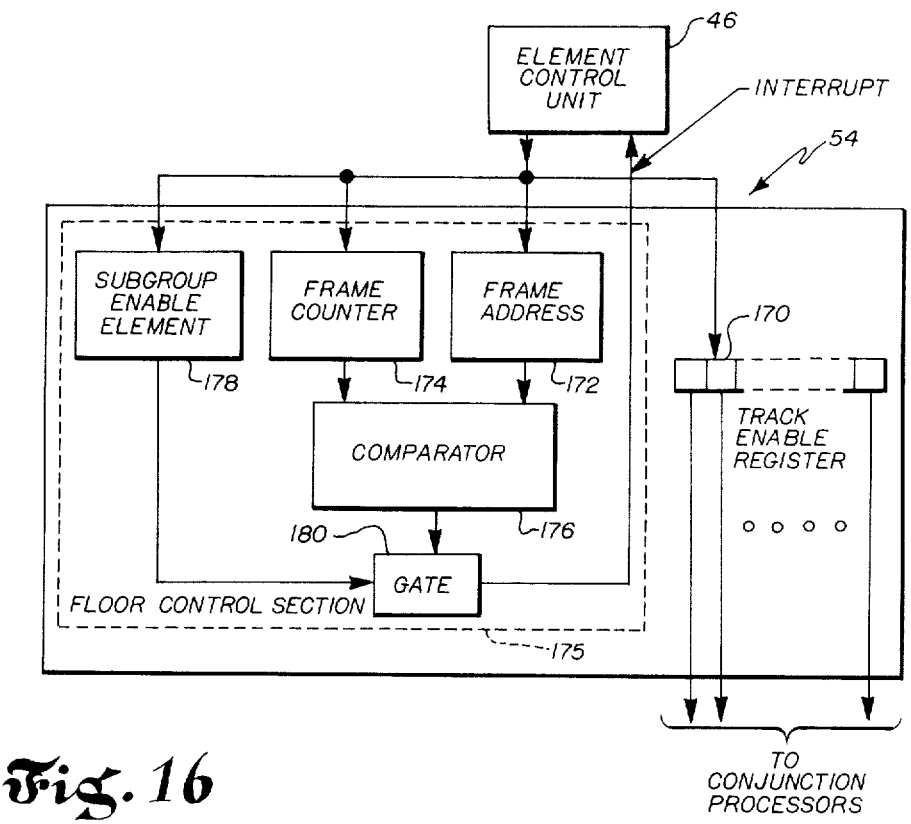
FIG. 16 is a block diagram showing in more detail the address unit shown as a block in FIG. 3.

Referring now to FIG. 16, a block diagram of the address unit 54 of FIG. 3 is disclosed. Address unit 54 has basically two functions, the first function being to define the physical boundaries of the search, and the second function being to maintain in memory the location of the first, and then subsequently higher, records in a multiple-match situation which satisfy the search specification and which hence will be or have been returned to the using computer. This is referred to as record flooring.

Initially, a pair of boundary registers (not shown) are set from the search specification through element control unit 46. This pair of boundary registers specifies the first and last data tracks in the memory area to be searched. The search area encompassed between the first and last data tracks may be entirely within one peripheral memory device or may span several additional peripheral memories, or contiguous fractions thereof.

The data in the boundary registers is used to initialize track enable register 170 in the address unit 54 of each subgroup processing element 38. Track enable register 170 comprises a sufficient number of bit storage units to accommodate a data bit for each track in a subgroup, i.e. each record in a record frame, with the value of each data bit being either valid (one) or non-valid (zero).

Each bit storage unit in track enable register 170 is connected to conjunction processor 79 in each of the pass-one subprocessors 44, which in total, comprise pass-one processor 43 as shown in FIG. 5. The data bit in each bit storage unit enables or disables the operation of its associated conjunction processor 79. This effect is clearly shown in the truth table of FIG. 9. In a non-multiple match situation, the bits in the track enable register 170 will be all ones.

When a multiple match occurs, however, record flooring is necessary. This is accomplished by a number of elements collectively shown as floor control section 175, in combination with the track enable register 170. Floor control section 175 maintains the frame address of first the lowest, and then successively higher, multiple-match records in the subgroup. This is referred to as a floor address. The floor address becomes the lower search boundary on a subsequent search for the other multiple-match records. The multiple-match record with the next highest address in the subgroup will be returned on the next search.

This process is repeated until all records satisfying the search specification have been returned. The searches after the first search are performed with an "equality" range operator search against the value field of the remaining records in the subgroup. This procedure simplifies the subsequent searches and decreases significantly the overall time required.

In the case of a multiple match, the first search of the records in the data base is performed without flooring. The subgroup location of the lowest address record in the multiple match is then identified, and the corresponding subgroup enable element 178 of floor control section 175 is set to a true (binary one) condition. The corresponding subgroup enable elements of the other subgroup processing elements remain not true. Frame address register 172 of floor control section 175 is then set to the frame number of the same lowest address record by element control unit 46. This is the address "floor", and indicates the beginning point, both in terms of subgroup and frame number, of the next search.

A frame counter 174 is cleared at the same time by element control unit 46 and then sequentially incremented as each frame of records in the subgroup is scanned on the search for the next multiple-match record. A comparator 176 compares the value in frame counter 174 with the value in frame address register 172 and generates an output signal when they are equal. The output signal from comparator 176 is gated together with the true signal from subgroup enable element 178 in gate 180 to produce an interrupt signal which in turn is applied back to element control unit 46.

Initially, for the second and following searches in a multiple-match situation, all bit storage units in track enable register 170 are cleared, so that no valid record test data comes out of the conjunction processor 79 in the subgroup processing element 38. This continues as the search progresses rapidly to the record frame specified in the frame address register 172. When an interrupt signal is received from floor control section 175, element control unit 46 sets those bits in track enable register 170 to one which correspond to the remaining records in the particular record frame being processed which have addresses greater than or equal to the address specified in the frame address register 172. The remaining records in the frame are then searched.

Element control unit 46 also increments the frame address register 172 by one so that a second interrupt is generated on the next frame. On the second interrupt, element control unit 20 will set all bits in track enable register 170 to a valid condition. Processing then continues normally for the remainder of the subgroup until the next multiple-match record is reached.

Hence, on a second search, those records in the record frames preceding the frame address in register 172 will not satisfy the search specification. In the frame in which the floor record is located, only those addresses greater than or equal to the address of the floor record can satisfy the search specification. The subsequent records, i.e., those records in subsequent frames, will be searched normally until the other multiple-match records are discovered, at which point the above process will be repeated.

Figure 17:
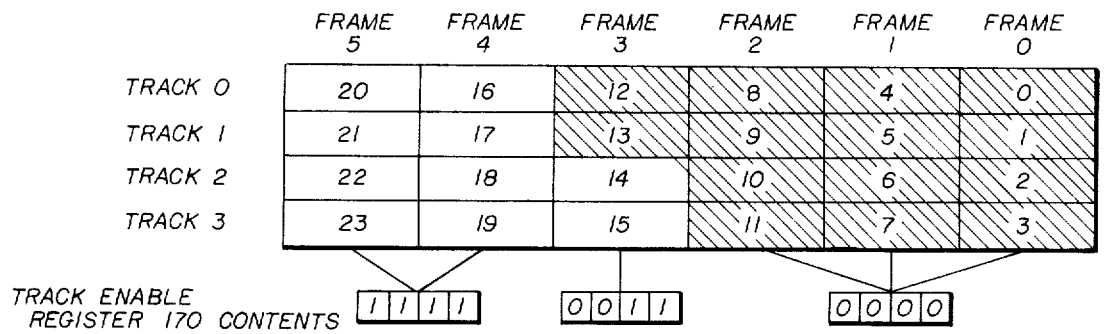
FIG. 17 illustrates the contents of track enable register 170 in a second search for a multiple match situation.

FIG. 17 illustrates this procedure, as it shows a total of 23 records in a subgroup, with record 14 being the floor record. Hence, in a second search for a multiple-match situation track enable register 170 will remain at all zeros for frames 1, 2 and 3, will be divided between ones and zeros in Frame 3, in which the floor record is located, and will be all ones for subsequent record frames, thus enabling a normal search of the records in those frames, without the necessity of searching all the previous record frames, which have already been searched.

Thus, a subgroup processing element has been described and shown which eliminates the problem of passing the data twice in an associative search processor similar to that shown and described in the U.S. Pat. No. 3,906,455. It should be remembered that various changes and modifications may be made to the present invention without departing from the spirit of the invention, which is defined by the claims which follow:

What is claimed is:

1. An apparatus for searching data which is stored as a sequence of logical records on at least one data track in a memory device, in accordance with a search specification originated by a digital computer, wherein the search specification comprises first and second test criteria which are applied, respectively, against first and second designated data in each logical record on the data track, and wherein the results of applying the first test criteria against the first designated data must be known prior to applying the second test criteria against the second designated data, even though said second designated data may occur before, or be part of, said first designated data in a particular logical record, said apparatus comprising:

first processing means for (1) searching a logical record to find the first designated data therein, and for (2) applying the first test criteria against the first designated data in said logical record;

means for recognizing said second designated data in said logical record during the processing of said logical record by said first processing means;

means for temporarily storing said recognized second designated data; and second processing means for applying the second test criteria against said temporarily stored second designated data following application of the first test criteria against the first designated data, whereby a search of said logical record using first and second search criteria against first and second designated data is accomplished in a single pass of the data comprising said logical record.

2. An apparatus in claim 1, wherein said first processing means includes means for producing a first signal indicative of whether or not said logical record satisfies said first test criteria, wherein said storing means includes means for temporarily storing said first signal, wherein said first processing means includes a plurality of first subprocessors for simultaneously searching a plurality of data tracks equal in number to the number of first subprocessors, wherein coincident logical records from the data tracks form a record frame, and wherein said second processing means, using the second designated data from each logical record in a record frame, determines the one record in said record frame which best satisfies the second test criteria.

3. An apparatus of claim 2, including means responsive to (1) the best second designated data in said record frame and the first signal associated therewith and (2) the best previous record in said plurality of data tracks to determine which record has the second designated data best satisfying the second test criteria.

4. An apparatus of claim 3, wherein said storing means includes a plurality of storage sections, with each first subprocessor having a storage section uniquely associated therewith.

5. An apparatus of claim 4, wherein each storage section includes two portions, each portion including two parts, wherein a first part of the first portion stores said first signal for said logical record, and a first part of the second portion stores said second designated data for said logical record, and wherein the second parts of said first and second portions store a first signal and second designated data from the last previous logical record searched, each storage section including means for transferring the first signal and the second designated data from the last previous logical record searched out of the storage section during the time that said logical record is being searched.

6. An apparatus of claim 5, wherein each logical record searched is subdivided into a plurality of data fields, one or more of which data fields are designated range fields comprising said first designated data, wherein said first test criteria includes at least one of the following: (1) an upper value limit, and (2) a lower value limit for each designated range field, and wherein said each of said first subprocessors, includes means for determining whether each range field has satisfied said upper and lower value limits.

7. An apparatus of claim 6, wherein said each first subprocessor includes a first comparator for comparing the value of each range field with said upper value limit, and a second comparator for comparing each range field with said lower value limit, said first and second comparators producing respectively, comparator output signals which indicate the numerical relationship of each range field with said upper and lower value limits, each of said first subprocessors further including comparator logic means for determining whether or not said comparator output signals satisfy said first test criteria, each of said first subprocessors further including conjunction logic means combining the determinations from said comparator logic means.

8. An apparatus of claim 7, wherein one of said data fields in each logical record is designated a value field, said value field containing said second designated data and wherein said second test criteria is comparative and is one of the following: (1) greatest or (2) least.

9. An apparatus of claim 8, wherein said second processing means includes a plurality of comparison processors, each comparison processor operative to accept two sets of input signals, each set of input signals including the first signal and the value field from one logical record in a given frame of logical records, each comparison processor including comparison processor logic means for determining which value field best satisfies the second test criteria, said second processing means including a sufficient number of comparison processors such that all of the records in a record frame may be processed simultaneously, each comparison processor including means passing to the output thereof the value field and the first signal of the one logical record from those two simultaneously presented to it best satisfying the second test criteria.

10. An apparatus of claim 9, wherein each comparison processor includes means for determining when said two sets of input signals equally satisfy the second test criteria, and further, includes means for indicating said equal satisfaction at the output of said second processing means.

11. An apparatus of claim 10, wherein said second processing means includes a comparator which is operative to compare the value fields from each set of inputs and to generate a value field comparator output signal indicative of their relative numerical relationship, said second processing means including processing logic means evaluating said value field comparator output signal with said second test criteria.

12. An apparatus of claim 11, wherein said processing logic means includes means preventing evaluation of either of said sets of inputs when said first signal of either set of inputs indicates that the logical record represented thereby does not satisfy the first test criteria.

13. An apparatus of claim 3, wherein said determining means includes means for comparing the value field of the best logical record of the frame of logical records just processed with the value field of the best previous logical record in all prior record frames searched.

14. An apparatus of claim 13, wherein said determining means includes means for storing the second frame and track address of the best logical record searched.

15. An apparatus of claim 14, wherein said determining means includes means for terminating the search when the first logical record is found which satisfies the search specification.

16. An apparatus of claim 13, wherein said address means includes means for storing the address of the first logical record which satisfies said first and second test criteria when more than one logical record equally satisfy said first and second test criteria, and further includes means for preventing searching of any logical records having an address lower than the address of said first record on a subsequent search for the other logical records equally satisfying said first and second test criteria.

* * * * *

UNITED STATES PATENT AND TRADEMARK OFFICE
CERTIFICATE OF CORRECTION

PATENT NO. : 4,099,242
DATED : July 4, 1978
INVENTOR(S) : Houston, et al

It is certified that error appears in the above-identified patent and that said Letters Patent are hereby corrected as shown below:

Assignee: The Boeing Company, Seattle, Washington

Attorneys: Cole, Jensen & Puntigam P.S.

col. 18, line 36
    The word "in" should read --of--.

col. 19, line 12
    The comma should be eliminated.

Signed and Sealed this

Seventeenth Day of July 1979

[SEAL]

Attest:

Attesting Officer

LUTRELLE F. PARKER
Acting Commissioner of Patents and Trademarks